United States Patent
Park et al.

(10) Patent No.: US 8,823,215 B2
(45) Date of Patent: Sep. 2, 2014

(54) WIRELESS POWER TRANSMISSION AND RECEPTION APPARATUS HAVING RESONANCE FREQUENCY STABILIZATION CIRCUIT AND METHOD THEREOF

(75) Inventors: Se-Ho Park, Gyeonggi-do (KR);
Sung-Kweon Park, Gyeonggi-do (KR);
Young-Min Lee, Gyeonggi-do (KR);
Ki-Hyun Kim, Gyeonggi-do (KR);
Hong-Kweun Kim, Gyeonggi-do (KR);
Woo-Ram Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 413 days.

(21) Appl. No.: 13/029,807

(22) Filed: Feb. 17, 2011

(65) Prior Publication Data
US 2011/0198938 A1 Aug. 18, 2011

(30) Foreign Application Priority Data
Feb. 17, 2010 (KR) .................. 10-2010-0014320

(51) Int. Cl.
*H01F 27/42* (2006.01)
(52) U.S. Cl.
USPC .......................................................... 307/104
(58) Field of Classification Search
CPC .......... H01F 27/42; H01F 37/00; H01F 38/00
USPC .......................................................... 307/104
See application file for complete search history.

(56) References Cited

U.S. PATENT DOCUMENTS

| 6,693,573 B1* | 2/2004 | Linder ......................... 341/143 |
| 2006/0255865 A1* | 11/2006 | Li ................................. 331/36 C |
| 2009/0243397 A1* | 10/2009 | Cook et al. ..................... 307/104 |
| 2010/0045114 A1* | 2/2010 | Sample et al. ................. 307/104 |
| 2010/0052431 A1* | 3/2010 | Mita .............................. 307/104 |
| 2010/0065352 A1* | 3/2010 | Ichikawa ....................... 180/65.8 |

\* cited by examiner

*Primary Examiner* — Rexford Barnie
*Assistant Examiner* — Joseph Inge
(74) *Attorney, Agent, or Firm* — The Farrell Law Firm, P.C.

(57) ABSTRACT

A wireless power transmission apparatus and method for wirelessly transmitting power to a wireless power reception apparatus electromagnetically coupled to the wireless power reception apparatus and supplying power for loads of the wireless power reception apparatus is provided. The apparatus includes a power generator for generating power having a fixed oscillation frequency; a power transmission resonator, which has a resonance frequency identical to the oscillation frequency, for wirelessly transmitting the power generated by the power generator to the wireless power reception apparatus; and a power transmission resonance frequency controller for controlling the resonance frequency of the power transmission resonator in response to a change of the resonance frequency of the power transmission resonator.

16 Claims, 3 Drawing Sheets

WIRELESS POWER TRANSMISSION AND RECEPTION APPARATUS HAVING RESONANCE FREQUENCY STABILIZATION CIRCUIT AND METHOD THEREOF

PRIORITY

This application claims priority under 35 U.S.C. §119(a) to a Korean Patent application filed in the Korean Intellectual Property Office on Feb. 17, 2010 and assigned Serial No. 10-2010-0014320, the contents of which are incorporated herein by reference.

BACKGROUND OF THE INVENTION

1. Field of the Invention

The present invention relates generally to a wireless charging device and method for using the same, and more particularly, to a resonance-type wireless charging device and method for performing charging through inductive coupling.

2. Description of the Related Art

In order to operate a mobile terminal, power must be continuously supplied. To provide continuous power, a mobile terminal is equipped with a battery, where the battery generally being charged by a charger. Research on contactless and wireless charging schemes have progressed in order to support portability in a charging scheme for charging a battery.

In particular, compared with a typical wireless charging scheme that uses inductive coupling over a short distance, a resonance-type wireless power transmission scheme capable of charging over longer distances has been recently proposed and researched.

Resonance-type wireless power transmission is based on evanescent wave coupling, in which an electronic wave moves from one medium to another medium over a short distance through an electronic field when the two media resonate in the same frequency. When a charging station connected to a power source forms such an electronic field and a wireless power reception device operating in the same resonance frequency as a MHz band of the electronic field approaches the charging station, an energy tunnel is created, thereby enabling charging of a portable device several meters away. Since the energy provided through resonance-type wireless power transmission is non-radiative and is based on a magnetic field, the energy is only delivered when a device having the resonance frequency exists. Thus, unlike other electronic waves, since non-used energy is reabsorbed into the electronic field instead of spreading to the air, the energy does not affect other surrounding machines or human bodies.

However, if a power reception resonator approaches a power transmission resonator, a mutual capacitance between the power reception and transmission resonators increases and a mutual inductance therebetween decreases, thereby changing a resonance frequency of the power reception and transmission resonators to a frequency different from a pre-defined frequency. If the resonance frequency of the power reception and transmission resonators moves, the efficiency of wireless power transmission decreases according to a decrease of a coupling coefficient due to frequency disharmony. In addition, output power of a power amplifier oscillated in a pre-fixed frequency decreases. Further, if a plurality of power reception resonators approaches the same power transmission resonator, the power reception resonators mutually act as parasitic components for each of the other plurality of power reception resonators, thereby decreasing a transmission/reception power gain and a Quality (Q)-factor.

SUMMARY OF THE INVENTION

An object of the present invention is to substantially solve at least the above-described problems and/or disadvantages and to provide at least the advantages described herein below. Accordingly, an object of the present invention is to provide a wireless power transmission apparatus and a wireless power reception apparatus for setting a resonance frequency having an optimal efficiency.

According to one aspect of the present invention, a wireless power transmission apparatus for wirelessly transmitting power to a wireless power reception apparatus electromagnetically coupled to the wireless power reception apparatus is provided. The wireless power transmission apparatus includes a power generator for generating power having a fixed oscillation frequency; a power transmission resonator, which has a resonance frequency identical to the oscillation frequency, for wirelessly transmitting the power generated by the power generator to the wireless power reception apparatus; and a power transmission resonance frequency controller for controlling the resonance frequency of the power transmission resonator in response to a change of the resonance frequency of the power transmission resonator.

According to another aspect of the present invention, a wireless power reception apparatus for wirelessly receiving power from a wireless power transmission apparatus electromagnetically coupled to the wireless power transmission apparatus is provided. The wireless power reception apparatus includes a power reception resonator for setting a resonance frequency of the wireless power reception apparatus to be identical to a resonance frequency of the wireless power transmission apparatus and receiving power from a power transmission resonator of the wireless power transmission apparatus through coupling with the power transmission resonator; and a power reception resonance frequency controller for sensing a change of power supplied from the power reception resonator to loads and controlling the resonance frequency of the power reception resonator.

According to another aspect of the present invention, a method performed in a wireless power transmission apparatus for wirelessly transmitting power to a wireless power reception apparatus electromagnetically coupled to the wireless power reception apparatus is provided. The method includes generating, by a power generator, power having a fixed oscillation frequency; wirelessly transmitting, by a power transmission resonator that has a resonance frequency identical to the oscillation frequency, the power generated by the power generator to the wireless power reception apparatus; and controlling, by a power transmission resonance frequency controller, the resonance frequency of the power transmission resonator in response to a change of the resonance frequency of the power transmission resonator.

According to another aspect of the present invention, a method performed in a wireless power reception apparatus for wirelessly receiving power from a wireless power transmission apparatus electromagnetically coupled to the wireless power transmission apparatus is provided. The method includes setting, by a power reception resonator, a resonance frequency of the wireless power reception apparatus to be identical to a resonance frequency of the wireless power transmission apparatus and receiving power from a power transmission resonator of the wireless power transmission apparatus through coupling with the power transmission resonator; and sensing, by a power reception resonance frequency controller, a change of power supplied from the power reception resonator to loads and controlling the resonance frequency of the power reception resonator.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF EMBODIMENTS OF THE PRESENT INVENTION

Embodiments of the present invention are described herein below with reference to the accompanying drawings. In the following description, although many specific items, such as components of a concrete circuit, are shown, they are only provided to help general understanding of the present invention, and it will be understood by those of ordinary skill in the art that the present invention can be implemented without these specific items. Further, in the following description, a detailed description of known functions and configurations incorporated herein has been omitted for clarity and conciseness.

Figure 1:
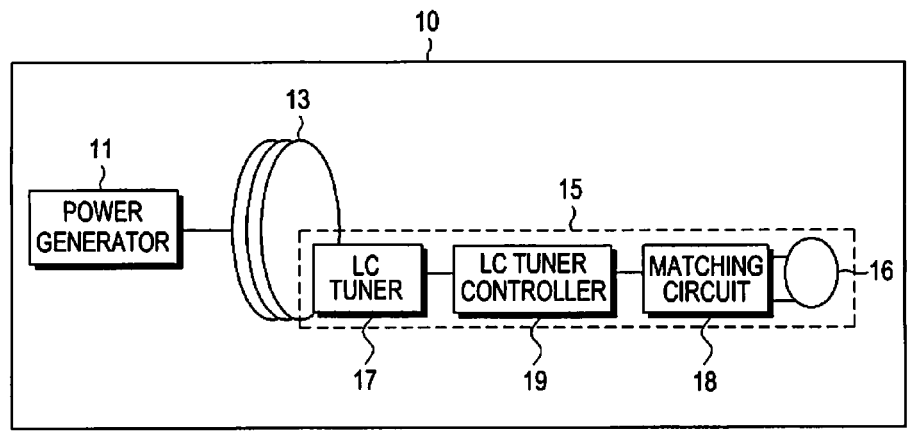
FIG. 1 is a schematic block diagram illustrating a wireless power transmission apparatus according to an embodiment of the present invention.

FIG. 1 is a schematic block diagram illustrating a wireless power transmission apparatus 10 according to an embodiment of the present invention. Referring to FIG. 1, the wireless power transmission apparatus 10 includes a power generator 11, a power transmission resonator 13, and a power transmission resonance frequency controller 15.

The power generator 11 generates an oscillation frequency for power transmission and applies the oscillation frequency to the power transmission resonator 13.

The power transmission resonator 13 has a resonance frequency identical to the oscillation frequency applied by the power generator 11 and transmits power according to the identical oscillation frequency.

However, since a frequency band of the resonance frequency of the power transmission resonator 13 may change according to a surrounding electromagnetic environment, thereby decreasing a wireless power transmission efficiency, the wireless power transmission apparatus 10 also includes the power transmission resonance frequency controller 15 for sensing the change of as well as controlling the resonance frequency. The power transmission resonance frequency controller 15 includes a monitoring resonator 16, an LC tuner 17, a matching circuit 18, and an LC tuner controller 19.

The monitoring resonator 16 senses a change of the resonance frequency. For example, the monitoring resonator 16 may be a resonator similar to a power reception resonator included in a wireless power reception apparatus and may be installed close to the power transmission resonator 13. The power reception resonator included in the wireless power reception apparatus may be a coil-type resonator, and the monitoring resonator 16 may also be a coil-type resonator in correspondence with the power reception resonator.

The LC tuner 17 is directly connected to the power transmission resonator 13 in order to change the resonance frequency by changing an LC value of the power transmission resonator 13. Here, the LC tuner controller 19 controls this operation of the LC tuner 17 and sets an LC value in order to maximize a power value received by the monitoring resonator 16.

Figure 3:
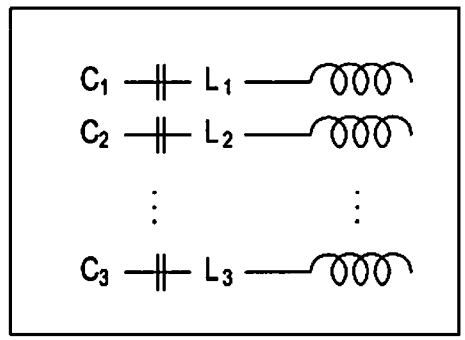
FIG. 3 is a schematic circuit diagram illustrating an LC bank included in the wireless power transmission apparatus and the wireless power reception apparatus, according to an embodiment of the present invention.

The LC tuner 17 may include, a variable Micro Electro-Mechanical Systems (MEMS) LC. Alternatively, the LC tuner 17 may include a selective LC switch bank in which an LC value is pre-set. Accordingly, the LC tuner 17 sequentially switches a plurality of selective LC switch banks connected in parallel (such as illustrated in FIG. 3, for example) or in series to the power transmission resonator 13 in a predetermined time interval. In the present example, the LC tuner controller 19 controls this operation of the LC tuner 17 and sets an LC value so that a power value received by the monitoring resonator 16 is maximized.

The matching circuit 18 matches an impedance of the monitoring resonator 16. The LC tuner controller 19 is connected to the matching circuit 18, and in response to an LC value sequentially changed in the predetermined time interval by the LC tuner 17, the LC tuner controller 19 checks transmitted wireless power through the monitoring resonator 16, sets an LC value for the maximum power value as an LC value of the power transmission resonator 13, and provides the set LC value to the LC tuner 17.

Figure 2:
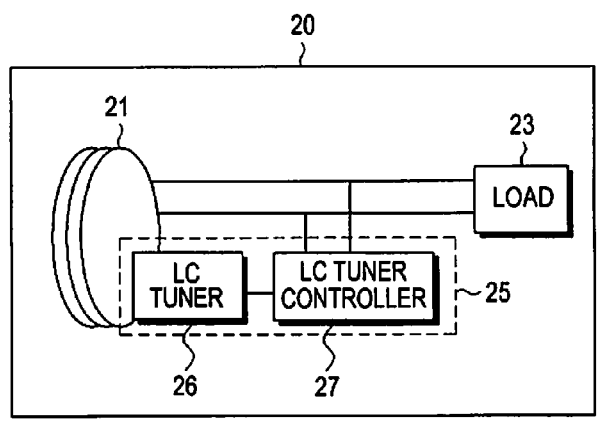
FIG. 2 is a schematic block diagram illustrating a wireless power reception apparatus according to an embodiment of the present invention.

FIG. 2 is a schematic block diagram illustrating a wireless power reception apparatus 20 according to an embodiment of the present invention. Referring to FIG. 2, the wireless power reception apparatus 20 includes a power reception resonator 21, which is connected to a load circuit 23 included in the wireless power reception apparatus 20 and provides received power to the load circuit 23.

A resonance frequency of the power reception resonator 21 is set to a frequency identical to the resonance frequency of the power transmission resonator 13 of the wireless power transmission apparatus 10. The power reception resonator 21 resonates through coupling with the power transmission resonator 13.

A frequency band of the resonance frequency of the power reception resonator 21 may be changed according to a surrounding electromagnetic environment, thereby decreasing a wireless power transmission efficiency. Accordingly, the wireless power reception apparatus 20 includes a power reception resonance frequency controller 25 for controlling the resonance frequency of the reception apparatus 20.

The power reception resonance frequency controller 25 includes an LC tuner 26 and an LC tuner controller 27. The LC tuner 26 is directly connected to the power reception resonator 21 in order to change the resonance frequency by changing an LC value of the power reception resonator 21. In the present example, the LC tuner controller 27 sequentially changes predetermined LC values in a predetermined time interval through sweeping. The LC tuner controller 27 also checks a power value by measuring power consumed by the load circuit 23, sets an LC value for the maximum power value, and provides the set LC value to the LC tuner 26.

In a manner similar to the LC tuner 17 included in the wireless power transmission apparatus 10 described above, the LC tuner 26 may include a variable MEMS LC or a selective LC switch bank, such that the LC tuner 26 checks the power value provided by the LC tuner controller 27 and sets an LC value for the maximum power value.

Figure 4:
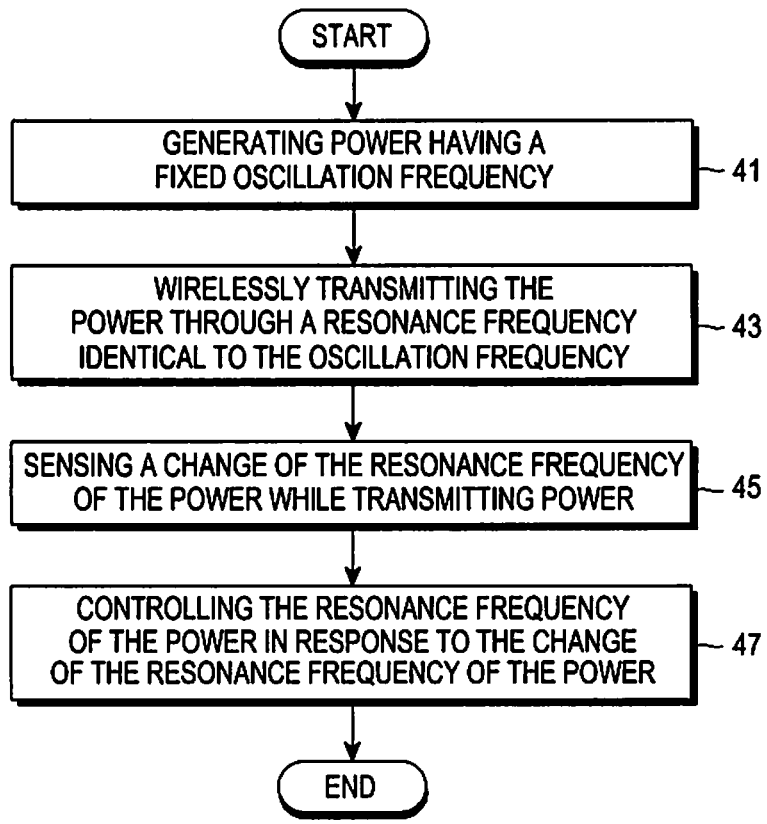
FIG. 4 is a flowchart illustrating a method for transmitting a wireless power according to an embodiment of the present invention.

FIG. 4 is a flowchart illustrating a method for transmitting a wireless power according to an embodiment of the present invention.

Referring to FIG. 4, in step 41, the power generator 11 of the wireless power transmission apparatus 10 generates an oscillation frequency for power transmission and applies the oscillation frequency to the power transmission resonator 13.

Then, in step 43, the power transmission resonator 13, which has a resonance frequency identical to the oscillation frequency, transmits wireless power according to the oscillation frequency to the wireless power reception apparatus 20.

In the process of transmitting power from the wireless power transmission apparatus 10 to the wireless power reception apparatus 20, a frequency band used for the wireless transmission may change according to a surrounding electromagnetic environment, thereby decreasing a wireless power transmission efficiency. Accordingly, the wireless power transmission apparatus 10 sets the resonance frequency through the power transmission resonance frequency controller 15 in an initial process of transmitting power to the wireless power reception apparatus 20. Alternatively, the wireless power transmission apparatus 10 sets the resonance frequency of the power transmission resonator 13 to maximize the wireless power transmission efficiency by continuously sensing a change of the resonance frequency while transmitting power to the wireless power reception apparatus 20. More specifically, in step 45, the monitoring resonator 16, which is disposed close to the power transmission resonator 13, senses the change of the resonance frequency. The sensed signal is provided to the LC tuner controller 19. Upon receiving the sensed signal, in step 47, the LC tuner controller 19 controls the LC tuner 17 so that the LC tuner 17 has a first LC value. Then, the power transmission resonator 13 transmits wireless power by using the resonance frequency set to the first LC value. At this time, the monitoring resonator 16 monitors the resonance frequency set to the first LC value, the matching circuit 18 impedance-matches the monitored resonance frequency, and the impedance-matched signal is provided to the LC tuner controller 19. The LC tuner controller 19 checks a power value corresponding to the first LC value. Likewise, the LC tuner controller 19 controls the LC tuner 17 so that the LC tuner 17 sequentially provided with a second LC value, a third LC value, . . . , and an $n^{th}$ LC value in a predetermined time interval and checks power values in the cases of the second LC value, the third LC value, . . . , and the $n^{th}$ LC value, where "n" is the number of LC values determined within the predetermined interval. The LC tuner controller 19 sets an LC value corresponding to a maximum power value determined from among the first to $n^{th}$ LC values as an LC value of the power transmission resonator 13 and provides the set LC value to the LC tuner 17.

Accordingly, the LC tuner 17 is set with the LC value corresponding to the maximum power value, and the power transmission resonator 13 transmits wireless power to the wireless power reception apparatus 20 through a resonance frequency having a relatively high power efficiency.

Figure 5:
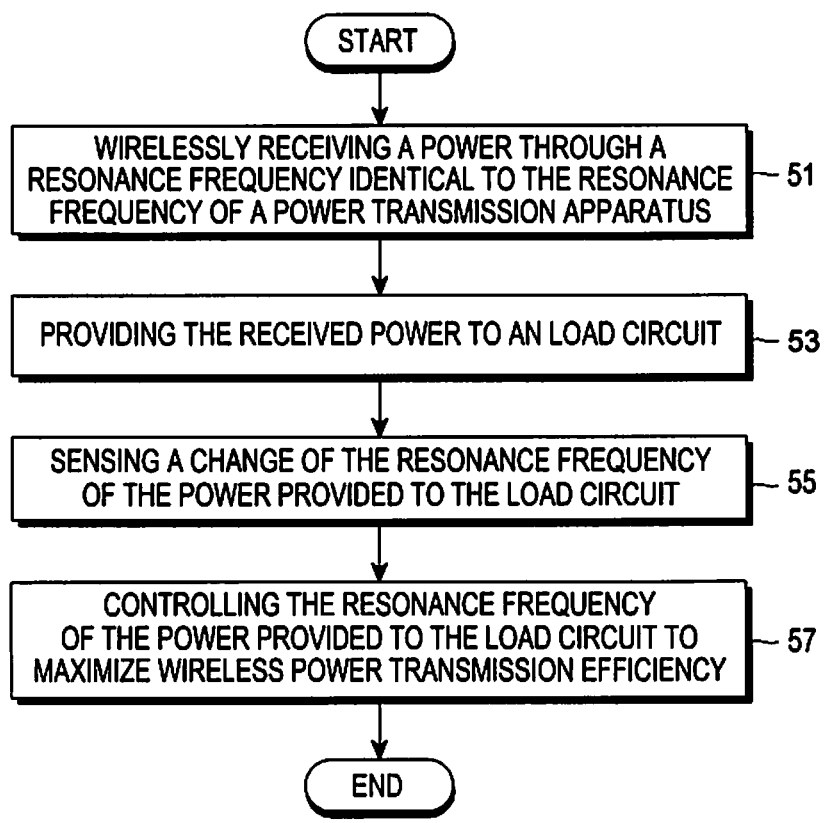
FIG. 5 is a flowchart illustrating a method for receiving a wireless power according to an embodiment of the present invention.

FIG. 5 is a flowchart illustrating a method for receiving a wireless power according to an embodiment of the present invention.

Referring to FIG. 5, in step 51, the power reception resonator 21 in the wireless power reception apparatus 20, which has the same resonance frequency as that the resonance frequency of the power transmission resonator 13, receives power transmitted from the wireless power transmission apparatus 10 through wireless coupling with the power transmission resonator 13. Then, in step 53, the power reception resonator 21 provides the received power to the load circuit 23.

Likewise in the wireless power transmission apparatus 10, a resonance frequency band of the power reception resonator 21 of the wireless power reception apparatus 20 may also change according to a surrounding electromagnetic environment, thereby decreasing a wireless power reception efficiency. Accordingly, the wireless power reception apparatus 20 the LC tuner controller 27 senses a change of the resonance frequency of the power provided to the load circuit in step 55 and controls the resonance frequency for the maximum efficiency in wireless power reception through the power reception resonance frequency controller 25 in step 57. More specifically, if wireless power is received by the power reception apparatus 20, the LC tuner controller 27 controls the LC tuner 26 so that the LC tuner 26 is provided with the first LC value. Then, the power reception resonator 21 receives wireless power through a resonance frequency set to the first LC value. Then, the LC tuner controller 27 checks a power value corresponding to the first LC value. Likewise, the LC tuner controller 27 sets so that the LC tuner 26 sequentially provided with the second LC value, the third LC value, . . . , and the $n^{th}$ LC value in a predetermined time interval and checks power values in the cases of the second LC value, the third LC value, . . . , and the $n^{th}$ LC value. The LC tuner controller 27 sets an LC value for the maximum power value from among the first to $n^{th}$ LC values as an LC value of the power reception resonator 21 and provides the set LC value to the LC tuner 26.

Accordingly, the LC tuner 26 is set to the LC value for the maximum power value, and the power reception resonator 21 receives wireless power by using a resonance frequency having a relatively high power efficiency.

As shown above, wireless power transmission and reception apparatuses according to embodiments the present invention can reduce transmission loss of wireless power, and maximize wireless power transmission efficiency.

Although the power transmission resonator 13 and the monitoring resonator 16 of the wireless power transmission apparatus 10 and the power reception resonator 21 of the wireless power reception apparatus 20 are depicted as coil-type resonators, the present invention is not limited thereto. Various modifications of the resonators may be included in accordance with embodiments of the present invention.

While the invention has been shown and described with reference to certain embodiments thereof, it will be understood by those skilled in the art that various changes in form and details may be made therein without departing from the spirit and scope of the invention as defined by the appended claims.

What is claimed is:

1. A wireless power transmission apparatus for wirelessly transmitting power to a wireless power reception apparatus electromagnetically coupled to the wireless power reception apparatus, the wireless power transmission apparatus comprising:

a power generator for generating power having a fixed oscillation frequency;

a power transmission resonator, which has a resonance frequency identical to the oscillation frequency, for wirelessly transmitting the power generated by the power generator to the wireless power reception apparatus; and a power transmission resonance frequency controller configured to monitor a change of the resonance frequency of the power wirelessly transmitted from the power transmission resonator, and to control the resonance frequency of the power transmission resonator based on the change of the resonance frequency of the power transmission resonator, wherein the power transmission resonance frequency controller comprises an LC tuner, a monitoring resonator, a matching circuit for processing impedance matching of the monitoring resonator, and an LC tuner controller connected to the matching circuit, and wherein the LC tuner controller checks a power value input through the monitoring resonator and controls the LC tuner according to an LC value corresponding to a maximum power value.

2. The wireless power transmission apparatus of claim 1, wherein
the LC tuner sequentially changes an LC value of the power transmission resonator to at least two predetermined LC values, and
the monitoring resonator is disposed close to the power transmission resonator, for monitoring the change of the resonance frequency of the power wirelessly transmitted from the power transmission resonator.

3. The wireless power transmission apparatus of claim 1, wherein the LC tuner is a variable Micro Electro-Mechanical Systems (MEMS) LC.

4. The wireless power transmission apparatus of claim 1, wherein the LC tuner is a selective LC switch bank.

5. A wireless power reception apparatus for wirelessly receiving power from a wireless power transmission apparatus electromagnetically coupled to the wireless power transmission apparatus, the wireless power reception apparatus comprising:
a power reception resonator for setting a resonance frequency of the wireless power reception apparatus to be identical to a resonance frequency of the wireless power transmission apparatus and receiving power from a power transmission resonator of the wireless power transmission apparatus through coupling with the power transmission resonator; and
a power reception resonance frequency controller for sensing a change of the resonance frequency of power supplied from the power reception resonator to loads and controlling the resonance frequency of the power reception resonator,
wherein the power reception resonance frequency controller comprises an LC tuner, a monitoring resonator, a matching circuit for processing impedance matching of the monitoring resonator, and an LC tuner controller connected to the matching circuit, and
wherein the LC tuner controller checks a power value input through the monitoring resonator and controls the LC tuner according to an LC value corresponding to a maximum power value.

6. The wireless power reception apparatus of claim 5, wherein the LC tuner sequentially sets an LC value of the power reception resonator to at least two predetermined LC values.

7. The wireless power reception apparatus of claim 5, wherein the LC tuner is a variable Micro Electro-Mechanical Systems (MEMS) LC.

8. The wireless power reception apparatus of claim 5, wherein the LC tuner is a selective LC switch bank.

9. A method performed in a wireless power transmission apparatus for wirelessly transmitting power to a wireless power reception apparatus electromagnetically coupled to the wireless power reception apparatus, the method comprising:
generating power having a fixed oscillation frequency;
wirelessly transmitting the power generated by the power generator to the wireless power reception apparatus through a resonance frequency identical to the oscillation frequency;
monitoring a change of the resonance frequency of the power wirelessly transmitted from a power transmission resonator;
controlling the resonance frequency of the power transmission resonator based on the change of the resonance frequency of the power wirelessly transmitted from the power transmission resonator; and
checking, by an LC tuner controller connected to a matching circuit, a power value input through a monitoring resonator, and controlling the LC tuner according to an LC value corresponding to a maximum power value.

10. The method of claim 9, wherein controlling the resonance frequency comprises:
sequentially changing, by the LC tuner, an LC value of the power transmission resonator to at least two predetermined LC values;
monitoring the change of the resonance frequency of the power wirelessly transmitted from the power transmission resonator; and
processing impedance matching of the monitoring resonator.

11. The method of claim 9, wherein the LC tuner is a variable Micro Electro-Mechanical Systems (MEMS) LC.

12. The method of claim 9, wherein the LC tuner is a selective LC switch bank.

13. A method performed in a wireless power reception apparatus for wirelessly receiving power from a wireless power transmission apparatus electromagnetically coupled to the wireless power transmission apparatus, the method comprising:
setting a resonance frequency of the wireless power reception apparatus to be identical to a resonance frequency of the wireless power transmission apparatus and receiving power from a power transmission resonator of the wireless power transmission apparatus through coupling with the power transmission resonator; and
sensing a change of the resonance frequency of power supplied from the power reception resonator to loads;
controlling the resonance frequency of the power reception resonator; and
controlling an LC tuner according to an LC value corresponding to a maximum power value.

14. The method of claim 13, further comprising:
sequentially setting, by the LC tuner, an LC value of the power reception resonator to at least two predetermined LC values; and
checking a power value supplied to a load of the wireless power reception apparatus.

15. The method of claim 13, wherein the LC tuner is a variable Micro Electro-Mechanical Systems (MEMS) LC.

16. The method of claim 13, wherein the LC tuner is a selective LC switch bank.

* * * * *